Patented Aug. 11, 1931

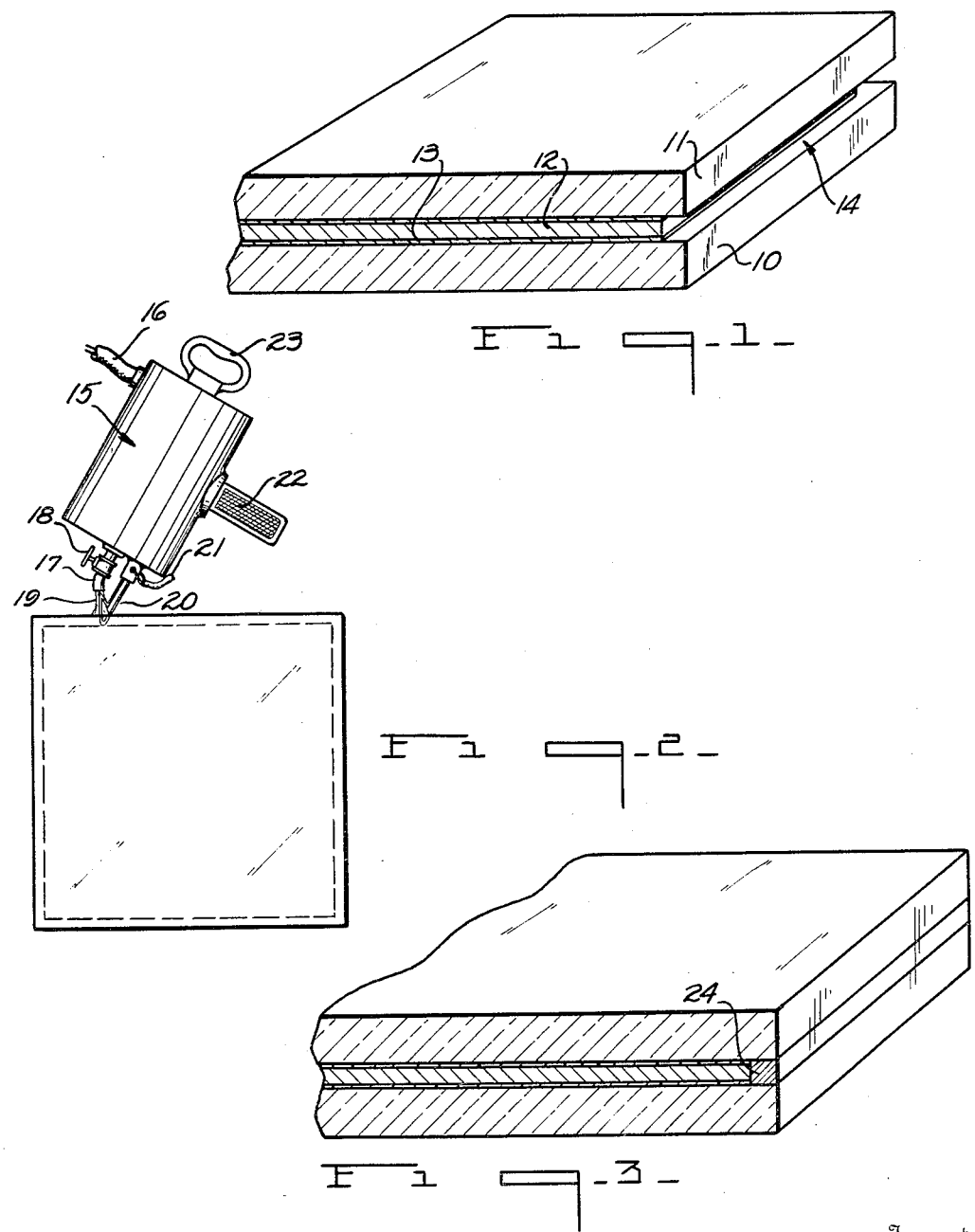

1,818,159

UNITED STATES PATENT OFFICE

JAMES W. H. RANDALL, OF NEW YORK, N. Y., ASSIGNOR TO LIBBEY-OWENS-FORD GLASS COMPANY, OF TOLEDO, OHIO, A CORPORATION OF OHIO

LAMINATED GLASS

Application filed February 24, 1928. Serial No. 256,585.

The present invention relates to a process and apparatus for sealing laminated glass.

An important object of the invention is to provide a process and apparatus for sealing liminated glass wherein liquid sealing material is fed into a groove in the laminated sheet by means of an electrically heated implement.

Another object of the invention is to provide a process and apparatus for sealing laminated glass wherein a container for the sealing medium and the sealing implement are movable as a unit, the sealing medium being adapted to be fed into the groove in which the seal is to be formed by means of an electrically heated member.

Other objects and advantages of the invention will become more apparent during the course of the following description.

In the drawings wherein like numerals are employed to designate like parts throughout the same, Fig. 1 is a perspective view, partly in section, illustrating a sheet of laminated glass before the seal has been applied, Fig. 2 is a diagrammatic view illustrating the sealing of the laminated sheet, and Fig. 3 is a perspective view, partly in section, illustrating a finished sheet of laminated glass including the seal.

Referring to Fig. 1, the numerals 10 and 11 designate two sheets of preferably transparent glass, whose surfaces may be ground and polished, or not, as desired. Interposed between the glass sheets and united thereto is a non-brittle sheet 12 which is joined to the glass sheets by means of an adhesive or the like 13. This invention is not limited to any particular type of laminated glass, the materials used in its structure, or the process of laminating.

As shown in Fig. 1, the sheet of laminated glass has a channel or groove 14 which is provided to receive the sealing medium.

In Fig. 2, the numeral 15 designates the sealing machine which comprises a receptacle adapted to contain the sealing material which may be any suitable resin, varnish, pitch, waxes, or the like. The sealing medium is preferably in a liquid or semi-liquid condition and is adapted to be mantained in this condition by means of an electrical heater arranged preferably around the receptacle and deriving current from the conduit 16. Any suitable form of rheostat or the like may be used to control the amount of current passing through the heater whereby to control the temperature and fluidity or viscosity of the sealing medium. Arranged preferably in the bottom of the receptacle containing the sealing medium is an outlet 17 controlled by means of a valve or the like 18. A flow of sealing material 19 is adapted to issue from the conduit 17.

To deposit the sealing material 19 in the channel 14, a preferably wire working end 20 is carried by the device 15. The member 20 is preferably formed from a nickel chrome wire which is adapted to be heated by current supplied through the cable 21, or if desired the cable 16 may also be used to supply the necessary current to the working end 20. In any event, it is desirable to provide a separate control means for the member 20 and the receptacle containing the sealing material. The wire 20 is so arranged with respect to the outlet conduit 17 that the sealing medium 19 flows directly thereon. Handle means 22 and 23 respectively are provided to hold and operate the device 15, and to deposit the sealing material in the channel 14 the valve 18 is properly adjusted to permit the flow of sealing medium to pass downwardly as illustrated in Fig. 2. By moving the device 15 with the wire 20 in the groove 14, it will be seen that the sealing material will be fed within the groove. Upon cooling, the seal 24, shown in Fig. 3, will result. The seal 24 will provide an efficient protecting means for the laminated sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of sealing laminated glass consisting in flowing the sealing material into the groove in the laminated sheet by means of an electrically heated wire.

2. A device for sealing laminated glass comprising a temperature control receptacle for containing the sealing material, an outlet therefor, and a heated wire onto which the sealing material flows.

3. A device for sealing laminated glass comprising a temperature control receptacle for containing the sealing material, a valve controlled outlet therefor, and an electrically heated wire for feeding the sealing material to the desired place.

4. The process of sealing laminated glass, consisting in flowing the sealing material onto an electrically heated wire, said wire being arranged in the groove of the laminated sheet adapted to receive the material, said material being guided by said electrically heated wire directly into the groove.

5. A device for sealing laminated glass, comprising a receptacle for containing the sealing material, an outlet therefor, an electrically heated wire carried by the receptacle and arranged in proximity to said outlet, the material passing through the outlet and flowing onto the electrically heated wire.

6. The process of sealing laminated glass, consisting in flowing the sealing material over an electrically heated wire having a portion thereof disposed in the groove of the laminated sheet adapted to receive said material in a manner that the material will be fed into said groove.

Signed at Toledo, in the county of Lucas and State of Ohio, this 17th day of February, 1928.

JAMES W. H. RANDALL.